US006072703A

United States Patent [19]
Tokunaga

[11] Patent Number: 6,072,703

[45] Date of Patent: Jun. 6, 2000

[54] POWER SUPPLYING APPARATUS AND METHOD FOR AN ELECTROPHOTOGRAPHIC APPARATUS

[75] Inventor: Atsuo Tokunaga, Hatano, Japan

[73] Assignee: Ricoh Company, Ltd., Tokyo, Japan

[21] Appl. No.: 09/219,884

[22] Filed: Dec. 24, 1998

[30] Foreign Application Priority Data

Dec. 26, 1997 [JP] Japan .................................... 9-368923

[51] Int. Cl.[7] .................................................... H02M 3/335

[52] U.S. Cl. ................................................. 363/21; 363/41

[58] Field of Search .................................. 363/21, 41, 97

[56] References Cited

U.S. PATENT DOCUMENTS

| | | | |
|---|---|---|---|
| 5,132,891 | 7/1992 | Kobayashi et al. | 363/21 |
| 5,398,891 | 3/1995 | Yeh | 363/21 |
| 5,715,149 | 2/1998 | Arikawa et al. | 363/21 |

*Primary Examiner*—Shawn Riley
*Attorney, Agent, or Firm*—Oblon, Spivak, McClelland, Maier & Neustadt, P.C.

[57] ABSTRACT

A power supplying apparatus for use in an electrophotographic apparatus. A switching device outputs an output current when a pulse of an input current is applied thereto, a switching control device controls a switching operation of the switching device by applying the pulse, and a transformer, a primary winding of which is connected with an output terminal of the switching device, generates a prescribed output voltage at its secondary winding by stepping-up an input voltage induced at the primary winding. The power supplying apparatus further includes a rectifying-smoothing device connected with the secondary part of the transformer, which rectifies and smooths an output current of the transformer, a parallel resistance member connected in parallel with the secondary winding of the transformer by the rectifying-smoothing device, and an output terminal with a first side connected with a higher potential terminal of the parallel resistance and a second side connected with a process device of the electrophotographic apparatus grounded. The switching control device controls the switching operation of the switching device in a first mode such that a prescribed amount of constant current flows through the output terminal and in a second mode such that no current flows through and a prescribed voltage is induced at the output terminal.

34 Claims, 6 Drawing Sheets

POWERED SUPPLYING CONTROL PART A

POWERED SUPPLYING CONTROL PART A

POWERED SUPPLYING CONTROL PART A

POWERED SUPPLYING CONTROL PART A

POWER SUPPLYING APPARATUS AND METHOD FOR AN ELECTROPHOTOGRAPHIC APPARATUS

BACKGROUND OF THE INVENTION

1. Field of the Invention

This invention relates to a power supplying apparatus and method for use in an electrophotographic process, and in particular, relates to a power supplying apparatus and method capable of selectively supplying a constant current in the electrophotographic process, or stopping supplying of the constant current and instead impressing a prescribed bias voltage by modulating a duty cycle of a pulse generated by a switching regulator or the like.

2. Discussion of the Background

In a background image-forming apparatus such as a printer, a copier, a facsimile, and so on, which forms an image using an electrophotographic process, an electrical power source that supplies a high voltage of more than a few kilovolts to a discharge device so that the discharge device evenly discharges a surface of a photo-conductive drum (hereinafter referred to as a PC drum) with corona discharge is well known. Such an electrical power source generates a direct current to be supplied, for example, to a discharge device. The direct current is obtained by rectifying an alternating current induced by a transformer (as discussed below). The background electrical power source generally includes a switching regulator that outputs pulses of an electrical current having a prescribed duty cycle and a width and a switching element, such as a transistor, which is connected with the switching regulator to be activated and deactivated by the pulses output from the switching regulator.

The background electrical power source further includes a transformer connected with the switching element, which may generate a voltage as a primary voltage when the switching element is activated, and which obtains a step-up voltage as a secondary voltage. The background electrical power source further includes a rectifying-smoothing circuit connected with a secondary winding of the transformer, which may rectify and smooth an alternating current having the secondary voltage to obtain a direct current. The rectifying-smoothing circuit is connected with a discharge device for use, for example, in an image forming apparatus to supply the direct current thereto. A corotron type discharge device is generally used for the discharge device, which is generally constituted by a tungsten steel wire as an electrode and a shield plate.

To discharge a surface of a PC drum using the discharge device, a direct current having a voltage greater than a breakdown voltage of the discharge device is generally required to be supplied to the discharge device. To generate this voltage, the switching regulator is controlled to generate pulses of a direct current at a prescribed duty cycle to activate and deactivate the switching element.

In the background discharge device, toner or the like tends to be attracted by the tungsten wire or the like and to stick to the tungsten wire. This results because an electromagnetism remains in the tungsten wire due to a usage of a high voltage for the corona discharge or the like even after an electrical current is stopped from being supplied to the tungsten wire. As a result, the toner sticking on the tungsten wire may cause a contamination of an image when an image formation is executed with the discharge device. The background power supplying apparatus then impresses a bias voltage having a prescribed level to the discharge device during a time when corona is not discharged to the surface of the PC drum to prevent toner from sticking thereto.

However, the background power supplying apparatus requires a large space in the image forming apparatus and is costly. This results because an extra bias voltage-applying device that applies the bias voltage to the discharge device and a control device that controls the bias voltage-apply device are used in the background power supplying apparatus.

SUMMARY OF THE INVENTION

Accordingly, an object of the present invention is to address and resolve the above-identified and other problems.

A further object of the present invention is to provide a novel power supplying apparatus which can efficiently apply a bias voltage for a corona discharge operation.

The present invention achieves these and other objects by presenting a novel power supplying apparatus for use in an electrophotographic apparatus, and which includes a switching device that outputs an output current when a prescribed pulse of an input current is applied thereto, and a switching control device that controls an output operation of the switching device by generating the prescribed pulse. The prescribed pulse has a prescribed width and a prescribed duty cycle and is applied to the switching device.

The novel power supplying apparatus further includes a transformer, a primary winding of which is connected with the switching device, which generates a prescribed output voltage at its secondary winding by stepping-up an input voltage induced at the primary winding, and a rectifying-smoothing device connected with the secondary winding of the transformer device, which rectifies and smooths an output current induced by the transformer.

The novel power supplying apparatus further includes a parallel resistance connected in parallel with the secondary winding of the transformer device via the rectifying-smoothing device, and an output terminal, a first side of which is connected with a higher potential terminal of the parallel resistance and a second side of which is connected with a grounded process device of the electrophotographic apparatus. Further, the switching control device controls the switching operation such that a prescribed amount of constant current flows through the process device in a first mode, and no current flows therethrough and a prescribed voltage is induced at the output terminal in a second mode.

The novel power supplying apparatus may include a feedback circuit with a first side connected with the secondary winding of the transformer and a second side connected with the switching control device. Further, the feedback circuit feeds back an output signal representative of an output of the transformer to the process device to the switching control device.

The switching control device may include a switching regulator, a reference signal applying device that applies a reference signal to the switching regulator, which reference signal represents a prescribed amount of a current to flow through a process device during a discharge operation, a ground level applying device that applies a ground level voltage to the switching regulator when a discharge operation is stopped, and a switch member that selectively connects the switching regulator with either the reference signal applying device or the ground level applying device. Further, the switching regulator may either 1) modulate a width of the pulse of a direct current flowing therefrom such that a constant current flows through the process device during a discharge operation when the reference signal applying device is connected with the switching regulator in a first mode, or 2) modulate the width of the pulse to a zero level when the ground level applying device is connected therewith in a second mode.

Further, the switching control device may include a microcomputer having a memory that stores at least data representative of a zero voltage and data representative of a prescribed reference voltage that causes a prescribed amount of a current to flow through the process device during the discharge operation. The switching control device may also include an AID converter that receives a feedback signal and converts the feedback signal to a digital signal and a pulse width modulation timer that modulates a width of a pulse of a direct current flowing therefrom. The microcomputer may either 1) send a signal indicating a difference between the digital signal and the prescribed reference voltage to the pulse width modulation timer so that the pulse width modulation timer modulates the pulse such that the feedback signal accords with the prescribed reference voltage, and accordingly a constant current flows through the process device in a first mode, or 2) send data representative of the zero voltage to the pulse width modulation timer to modulate the width of the pulse to a zero level, and accordingly no current flows through the process device and a prescribed voltage is impressed thereon in a second mode.

Further, the switching control device may include a switching regulator, a reference signal applying device that applies a reference signal to the switching regulator, which reference signal represents a prescribed amount of a current to flow through a process device during a discharge operation, a pulse width modulation timer that outputs a direct current in a form of a pulse having a prescribed width such that no current flows through the process device and a prescribed voltage is impressed thereon, and a selection switch that selectively connects the switching device with either the switching regulator or the pulse width modulation timer.

Further, the switching control device may include a microcomputer having a memory that stores at least first data related to a signal that causes a status in which a prescribed amount of current flows through the process device, and data related to a signal that causes a status in which no current flows through the process device and a prescribed voltage is impressed thereon during a stoppage of a discharge operation thereof. The switching control device may also include an A/D converter that receives a feedback signal sent from a secondary part of the transformer and converts the feedback signal into a digital signal and a pulse width modulation timer that modulates a width of a pulse of a direct current flowing therefrom. The microcomputer either 1) sends a signal representative of a difference in voltage between the digital signal and the first data so that the pulse width modulation timer modulates the pulse such that the feedback signal accords with the first data, and accordingly, a prescribed constant current flows through the process device in a first mode, or 2) sends the second data to the pulse width modulation timer to modulate the width of the pulse such that no current flows through the process device and the prescribed voltage is impressed thereon in a second mode.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 8:
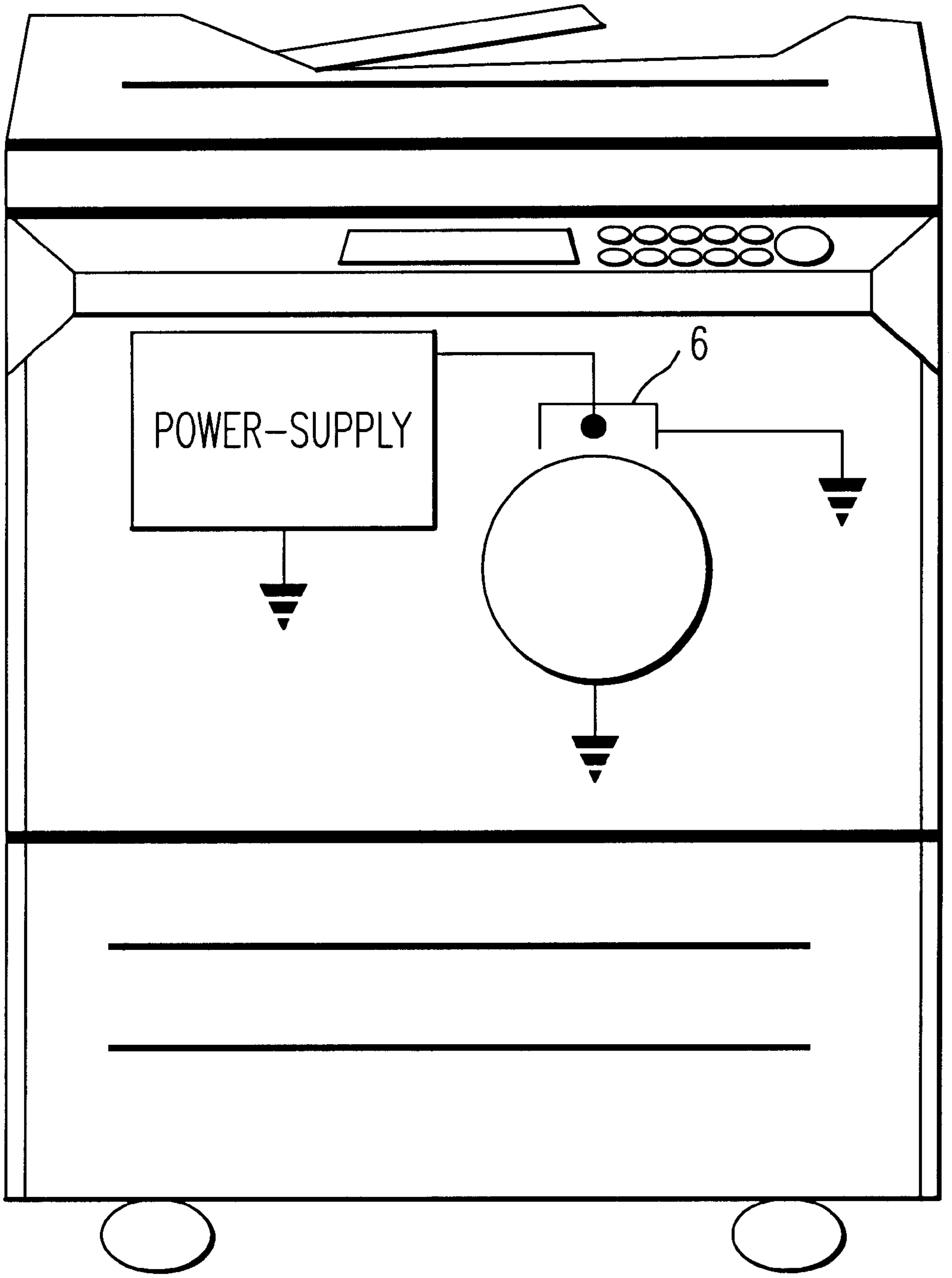
FIG. 8 shows an image forming apparatus in which the present invention can be implemented.

The embodiments of the present invention will now be described with reference to the noted Figures, in which like reference numerals designate identical or corresponding parts throughout the several views. A constitution of a circuit of a background power-supplying apparatus is initially briefly explained referring to FIG. 1. This power-supplying apparatus can be utilized in an image forming apparatus as shown in FIG. 8, in which case the power-supplying apparatus is connected to a discharge device 6, such as a corotron discharger.

Figure 1:
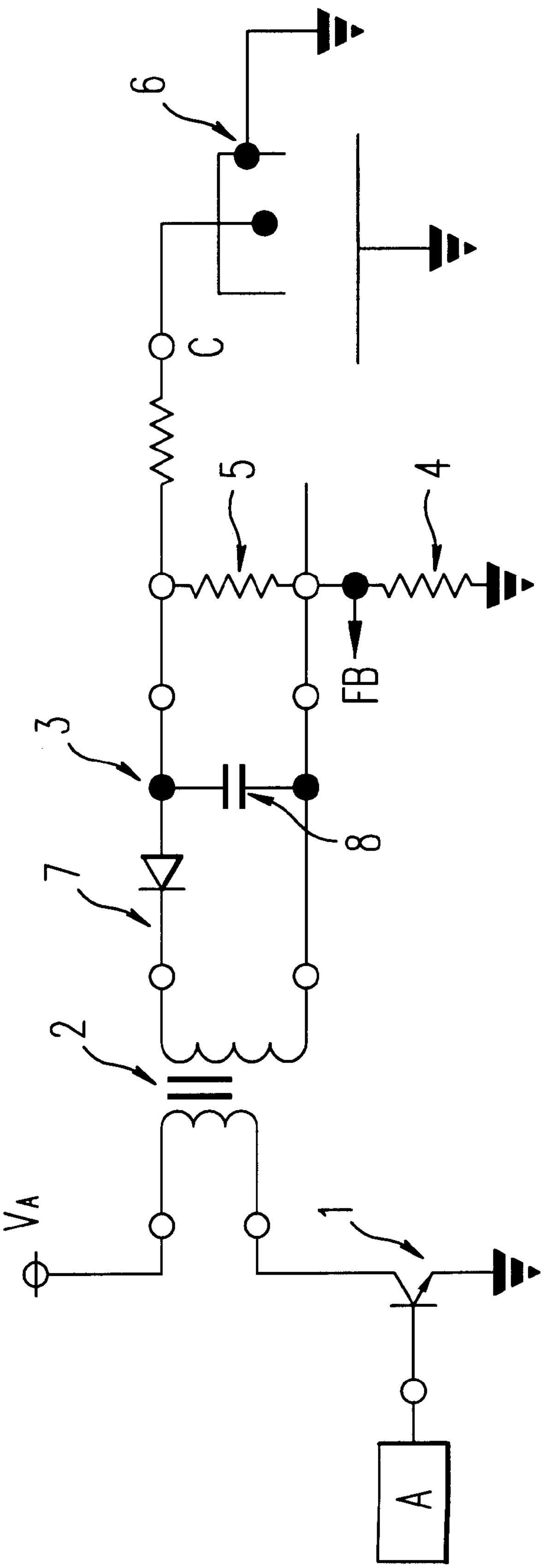
FIG. 1 is a schematic diagram that illustrates a circuit of a power supplying apparatus of the present invention.

As illustrated in FIG. 1, the background power supplying apparatus includes a power supplying control part A connected with a switching element 1 and which controls, for example, a duty cycle and a width of a pulse of a direct current to be supplied to the switching element 1. An electronic-type-switching element such as a transistor and a field-effect transistor (hereinafter referred to as a FET) can be used for the switching element 1.

The switching element 1 may be connected with the power supplying control part A with its base when a transistor is used. In this case of using the transistor its emitter is grounded. The switching element 1 may be connected with the power supplying control part A with its gate when a FET is used. In this case of using the FET its source is grounded. Either a collector of the transistor when the transistor is used or a drain of the FET when the FET is used is connected with an electrical power supplying voltage $V_A$. The power supplying apparatus may further include a step-up transformer 2. A first side of a primary winding of the step-up transformer 2 is connected with the power source voltage $V_A$. A second side of the primary winding is connected with the collector when the transistor is used or with the drain when the FET is used.

The power supplying apparatus may further include a rectifying-smoothing circuit 3 constituted by a rectifying diode 7 and a smoothing condenser 8. The rectifying-smoothing circuit 3 may be connected with a secondary winding of the step-up transformer 2. A difference in an electrical potential induced between both poles of the smoothing condenser 8 may be obtained as an output voltage to be applied to a discharge device 6 during its discharge operation. A parallel resistance 5 may be employed and connected in parallel with the smoothing condenser 8. An output detection circuit 4 is disposed with a first side connected with a lower voltage terminal of the parallel resistance 5. A second side of the output detection circuit 4 is connected to ground.

A voltage at the lower voltage terminal of the parallel resistance 5 is obtained as a feedback signal FB and is input to the power supplying control device A. A higher voltage side of the smoothing condenser 8 is connected with the discharge device 6, such as a corotron, through an output terminal C to supply a high voltage to the discharge device 6.

Hereinbelow, an operation of the above-mentioned power supplying apparatus is briefly explained. A power supplying voltage $V_A$ may be stepped-up to a prescribed level by the step-up transformer 2 when the power supply controller A controls the switching element 1 such that a prescribed amount of a current flows through the primary winding of the step-up transformer 2. A prescribed amount of the voltage is thus induced at the secondary winding of the step-up transformer 2 with an alternating current.

The alternating current may be transformed into a direct current by the rectifying-smoothing circuit 3. Some of the direct current is supplied to the discharge device 6, and a remaining amount of the direct current is grounded through the output detection circuit 4. A voltage induced by the output detection circuit is fed-back to the power-supplying controller A as feedback signal FB. The power-supplying controller A then modulates a pulse of a direct current flowing therefrom, which has a width and a prescribed duty cycle, based on the FB signal.

The direct current flows into the switching element 1 to control the switching element 1 such that the switching element 1 can be operated in the prescribed duty cycle. The above-mentioned feedback operation is repeated until a prescribed amount of a constant output current is obtained by the discharge device 6.

Figure 2:
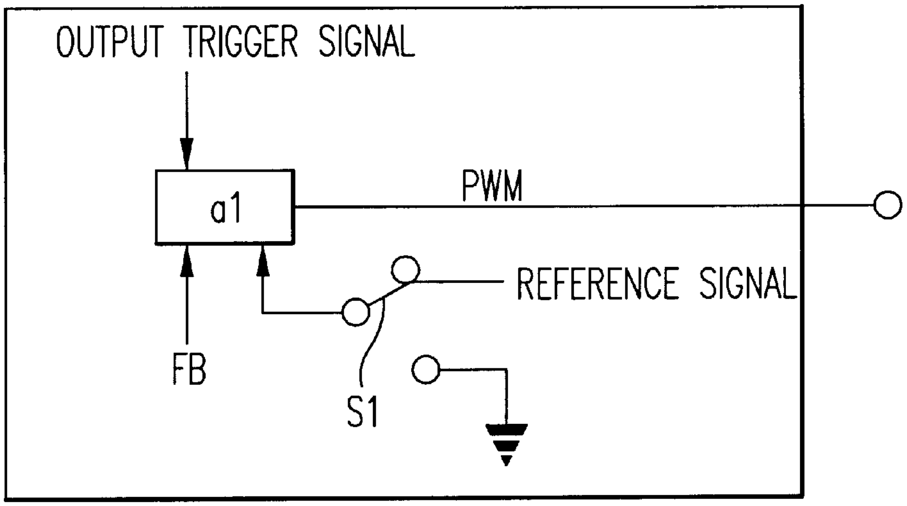
FIG. 2 is a block diagram that illustrates a constitution of a switching control device having a switching regulator, which is to be utilized in the power supplying apparatus illustrated in FIG. 1.

Hereinbelow, a first embodiment of the present invention is explained in detail referring to FIG. 2. A new constitution used for the power-supplying control part A illustrated in FIG. 1 is shown in a block chart in FIG. 2. As shown in FIG. 2, the power supply control part A includes a switching regulator a1 that controls a power supplying operation. The switching regulator a1 may generate a pulse of a direct current at a driving frequency of, e.g., 20 KHZ, which has a prescribed width. The feedback signal FB generated by output detection circuit 4 of FIG. 1 is input to the switching regulator a1.

An "output trigger signal" that may be generated by a process controller of an image forming apparatus (not shown) is input to the switching regulator a1. A "reference signal" related to a prescribed voltage that corresponds to a prescribed constant current to be supplied to discharge device 6 may be selectively input to the switching regulator a1. The reference signal may be changed according to a change in image quality, elapsing of time, a material of a photoconductive drum, other circumstances, and so on, to obtain high quality of an image. A ground level voltage may be selectively input to the switching regulator a1.

The switching regulator a1 may generate a direct current by modulating a duty cycle of the pulses and maintaining a prescribed number of a duty cycle so that the FB signal accords with the reference signal when the output trigger signal is input. Thus, a constant current that flows through the discharge device 6 for discharging a surface of the PC drum is finally obtained.

When a reference voltage having a zero level is input to the switching regulator a1 by turning a switch S1 from the above-mentioned prescribed reference level to the ground level, the discharge device 6 may stop discharging and a prescribed voltage is impressed on the discharge device 6. This results because the switching regulator a1 modulates a duty cycle of the pulses of direct current flowing to the switching regulator a1 so that the duty cycle becomes smaller, and finally no current flows either through the output detection circuit 4 or the discharge device 6.

When the duty cycle becomes smaller, the bias voltage impressed on the discharge device 6 correspondingly becomes smaller in a state that the discharge device 6 stops discharging and no current flows through both the discharge device 6 and the output detection circuit 4. At this time, however, since the duty cycle does not become a zero level, a prescribed amount of a voltage may still be applied to the discharge device 6. This results because a current flows through both the resistance 5 and the condenser 8 at the time, and accordingly, a voltage having a prescribed level may be applied to the output terminal C, which may be impressed on the discharge device 6 as the bias voltage. A voltage induced at the output detection circuit 4 corresponds to a voltage to be impressed on the discharge device 6.

If the output trigger signal is not input to the switching regulator a1, an output voltage of the output terminal C may completely disappear, since a duty cycle of the pulse becomes a zero level, and accordingly a switching operation of the switching element 1 may not be executed. As a result, no voltage is induced at the output terminal C. As mentioned-above, a status of the power supplying apparatus, in which a current flows through an output load such as discharge device 6, may be changed to another status thereof, in which no current flows through the output load and a prescribed amount of the bias voltage is impressed thereon by turning the switch S1 from the reference signal position to the ground level position. The process controller of the image forming apparatus may command the above-mentioned switch-turning operation at a prescribed timing.

Figure 3:
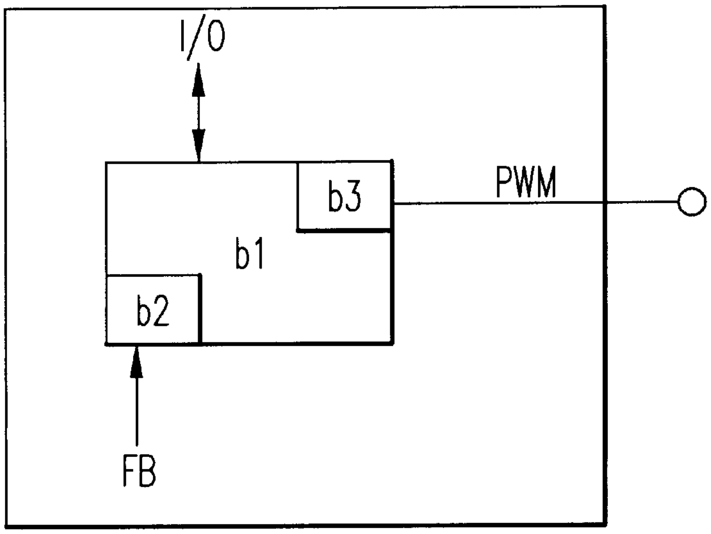
FIG. 3 is a block diagram that illustrates a constitution of another switching control device to be utilized in the power supplying apparatus illustrated in FIG. 1, which uses a microcomputer, an analog to digital converter (hereinafter referred to as an A/D converter), and a pulse width modulation timer (hereinafter referred to as a PWM timer) instead of using the switching regulator utilized in the switching control device illustrated in FIG. 2.

Hereinbelow, a second embodiment of the present invention is explained referring to FIG. 3. A constitution of the second embodiment is shown in a block chart in FIG. 3. As illustrated in FIG. 3, the second embodiment slightly modifies the first embodiment of FIG. 2. A microcomputer b1 that includes an A/D converter b2 and a PWM timer b3 may be employed in the second embodiment in place of the switching regulator a1 of the first embodiment. The A/D converter b2 may convert feedback signal FB, which is fed-back from output detection circuit 4 shown in FIG. 1, from a state of an analog signal constituted by a voltage into a digital signal.

The PWM timer b3 may modulate a width of a pulse of a direct current that flows into switching element 1 illustrated in FIG. 1 under control of the microcomputer b1. An I/O port is connected with the microcomputer b1, which inputs an output ON command to the microcomputer b1 when, for example, a process controller (not shown) of the image forming apparatus sends the output ON command. The microcomputer b1 includes a memory that stores at least data indicating both an output target voltage (explain in further detail below) and data indicating a zero voltage. The microcomputer b1 sends prescribed data indicating a difference in voltage between data converted from the FB signal by the A/D converter b2 and the data of the output target voltage to the PWM timer b3 when an output ON command is input from the I/O port to the microcomputer b1.

The PWM timer b3 presets a prescribed width of a pulse of a direct current that flows from the microcomputer b1 to the switching element 1 by modulating a previously set width of pulses based on the data of the difference in voltage so that data converted by the A/D converter b2 will be equal to the output target data stored in the memory of the microcomputer b1. Thus, a duty cycle of the pulse of the direct current having a frequency of, for example, 20 KHZ is modulated by the PWM timer b3.

To create a status of the power supply, in which the discharge device 6 stops discharging and a bias voltage is impressed thereon, an amount of the output target data stored in the memory of the microcomputer b1 is changed to be zero. The microcomputer b1 modulates the duty cycle of the pulse of the direct current such that the duty cycle becomes smaller so that no current flows through both the output detection circuit 4 and the discharge device 6. When the duty cycle becomes smaller, the same phenomenon as mentioned in the first embodiment occurs at the discharge device 6, resistance 5, and condenser 8 shown in FIG. 1.

Further, if an output voltage induced at an output terminal C illustrated in FIG. 1 is to disappear, an OFF command may be input to the microcomputer b1 through the I/O port. This results because pulses of the direct current to be generated by the microcomputer b1 disappear, and accordingly the switching element 1 is not operated. The above-described data change operation may be commanded by the process controller (not shown) of the image forming apparatus.

Hereinbelow, a third embodiment of the present invention is explained in detail referring to FIG. 4. A constitution of a control part A is shown in a block chart in FIG. 4. The power supplying control part A includes a switching regulator a1 that operates substantially in a same manner as the switching regulator a1 used in the first embodiment. The power supplying control part A further includes a PWM timer a2 that operates substantially in a same manner as the PWM timer b3 used in the second embodiment. The power supplying control part A further includes a switch S2 that selectively connects either the switching regulator a1 or the PWM timer a2 with the switching element 1 illustrated in FIG. 1.

Figure 4:
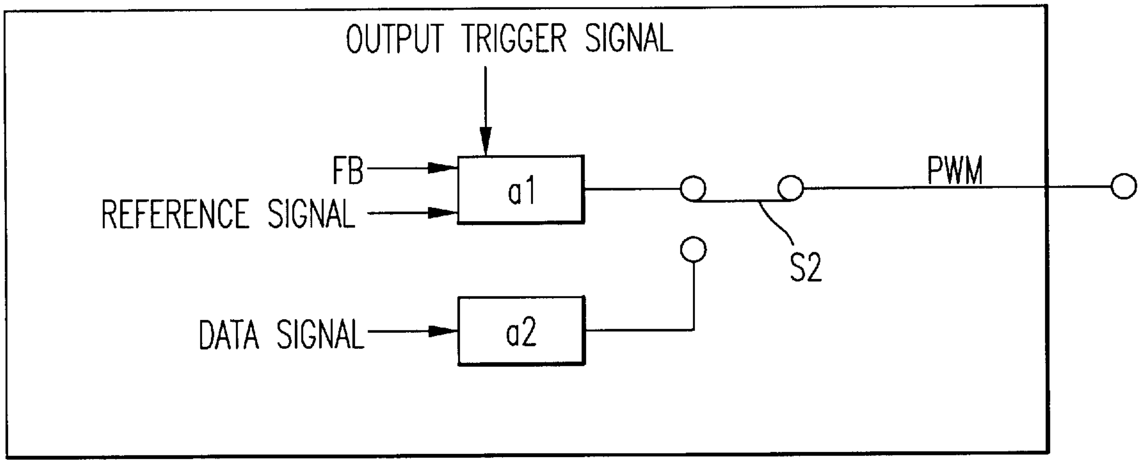
FIG. 4 is a block diagram that illustrates a constitution of still another switching control device to be utilized in the power supplying apparatus illustrated in FIG. 1, which includes a first switching control part constituted by a switching regulator that causes a constant current flowing through a discharge device and a second switching control part constituted by a PWM timer that causes no current and a prescribed bias voltage to be impressed on the discharge device.

An operation of a power supplying apparatus of this embodiment of FIG. 4 when the switch S2 is turned to connect to the switching regulator a1 is substantially the same as mentioned in the first embodiment. When the switch S2 is turned to connect to the PWM timer a2, the following operation is executed. The PWM timer a2 is activated by a prescribed preset signal input to the PWM timer a2, which indicates a prescribed duty cycle of a direct current that flows from the PWM timer a2. An operation of impressing a discharge voltage on the discharge device 6 during a discharge operation, an operation of stopping a current flowing through both the output detection circuit 4 and the discharge device 6, and an operation of a loop state current flowing through both resister 5 and condenser 8 when a bias voltage is to be induced are each executed substantially in a same manner as mentioned in the second embodiment.

The prescribed preset signal data is determined as described below.

Figure 7:
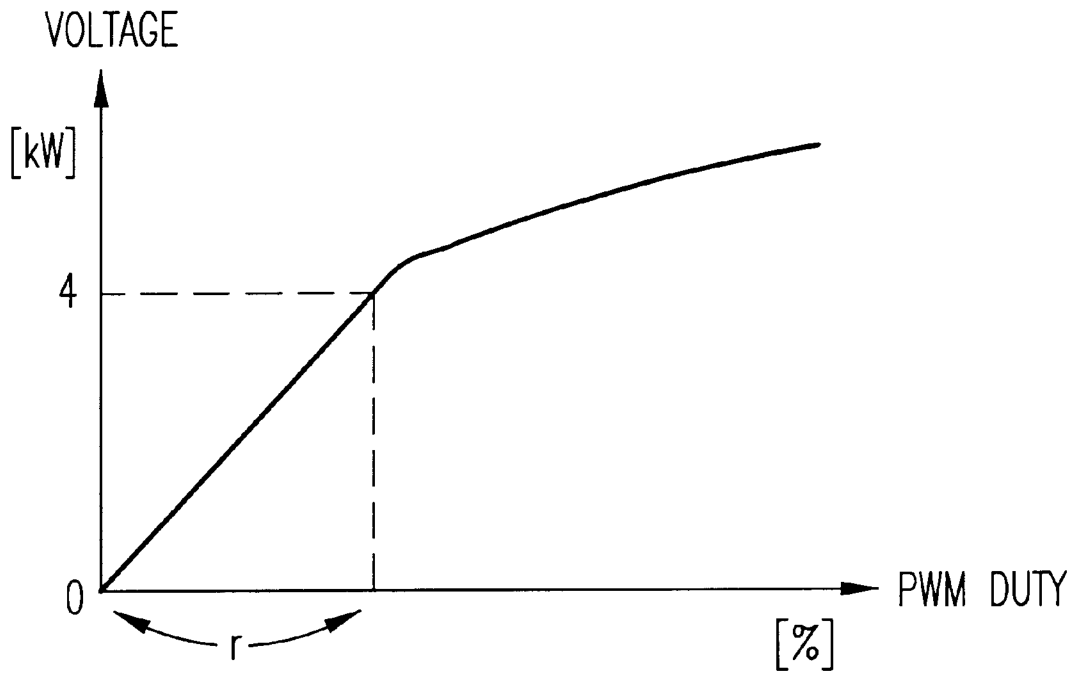
FIG. 7 shows a relation between a duty cycle of pulses and a voltage to be impressed on a discharge device which relates to the present invention.

When a discharge device 6 with a breakdown, for example, at a voltage of 4 kV is used, a relation between a duty cycle of pulses of a direct current, which activates and deactivates the switching element 1, and a voltage to be impressed on the discharge device 6 is obtained as illustrated in FIG. 7. A current may not flow to the discharge device 6 and only a voltage that is induced by a current flowing through both the condenser 8 and the resister 5 may be impressed on the discharge device 6 within a range indicated by r. The relation in the range of r is determined by an inherent condition of the power supplying apparatus.

Thus, if the breakdown voltage of the discharge device 6 is obtained beforehand and a relation between a duty cycle of the pulses of the direct current to flow into the switching element 1 and an output voltage as illustrated in FIG. 7 is pre-known, a duty cycle of the pulses of the direct current corresponding to the range of r, data of which is to be input to the PWM timer a2, may be obtained referring to the relation illustrated in FIG. 7. When an output trigger signal is stopped from being input to the switching regulator a1, no voltage appears at an output terminal C for the same reasons as mentioned earlier. Thus, two statuses of the power supplying apparatus, which are described above, are created by turning the switch S2 in a same manner as mentioned earlier. The process controller of the image forming apparatus may command the above-mentioned switch turning operation at a prescribed timing.

Figure 5:
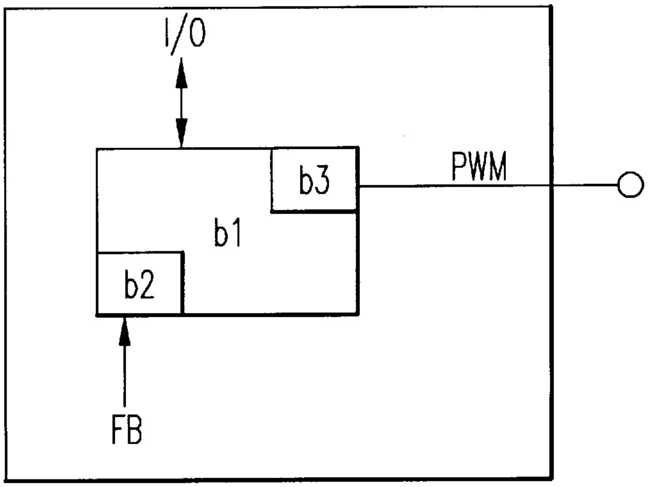
FIG. 5 is a block diagram that illustrates a constitution of still another switching control device to be utilized in the power supplying apparatus illustrated in FIG. 1, which uses a microcomputer, an A/D converter, and a PWM timer instead of using both the switching regulator and the PWM timer illustrated in FIG. 4.

Hereinbelow, a fourth embodiment that slightly modifies the third embodiment is explained referring to FIG. 5. A constitution of the fourth embodiment is shown in a block chart in FIG. 5. As illustrated in FIG. 5, a power supplying control part A of this embodiment uses a microcomputer b1 that includes an A/D converter b2 and a PWM timer b3, each used instead of the switching regulator a1 and the PWM timer a2 described in the earlier embodiments. The microcomputer b1 further includes a memory that stores at least an output target data that corresponds to a discharge voltage to be impressed on the discharge device 6 and a constant current to be supplied thereto during a discharge operation, and prescribed reference data that causes a status of the discharge device 6 in which no current flows therethrough and a prescribed bias voltage is impressed thereon.

The A/D converter b2 operates substantially in a same manner as the A/D converter b2 used in the second embodiment. The PWM timer b3 also operates substantially in a same manner as the PWM timer used in the second embodiment. However, the microcomputer b1 sends the prescribed reference data stored in the memory when the PWM timer b3 is selected by the microcomputer b1 so that a prescribed bias voltage is impressed on the discharge device 6. An OFF command may be input from an I/O port to the microcomputer b1 and then no voltage appears at the output terminal C for the same reasons as mentioned earlier.

This results because the A/D converter b2 and the PWM timer b3 are selectively used by the microcomputer b1, and the two statuses of the power supplying apparatus may be obtained. The process controller of the image forming apparatus may command the microcomputer b1 to send the prescribed reference data to the PWM timer b3.

Hereinbelow, modifications of the parallel resistance 5 having a prescribed fixed resistance amount, which is illustrated in FIG. 1, are explained referring to FIGS. 6A–6C. The modifications commonly include a variable resistance. Each of the modifications is applicable to each embodiment described above.

Figure 6A:
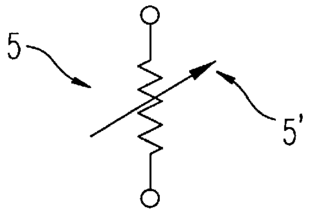
FIG. 6A is a chart that illustrates a first type of variable resistance, which can be used in the circuit illustrated in FIG. 1, to generate a bias voltage when no current flows through the discharge device.
Figure 6B:
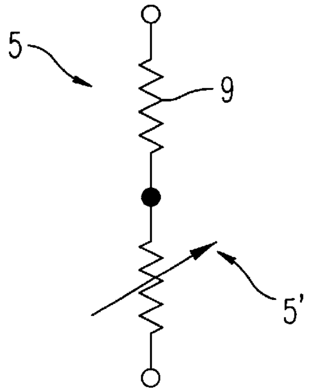
FIG. 6B is a chart that illustrates a second type of variable resistance, which can be used in the circuit illustrated in FIG. 1, to generate a bias voltage when no current flows through the discharge device.
Figure 6C:
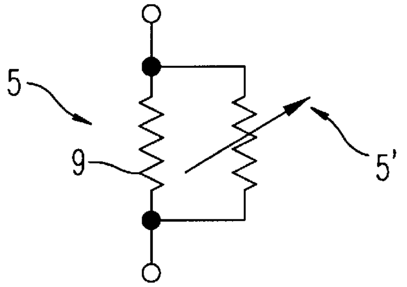
FIG. 6C is a chart that illustrates a third type of variable resistance, which can be used in the circuit illustrated in FIG. 1, to generate a bias voltage when no current flows through the discharge device.

As illustrated in FIG. 6A, a first modification simply includes a variable resistance 5' so that a bias voltage to be impressed on a discharge device 6 may vary. A second modification as illustrated in FIG. 6B includes a serial type resistance constituted by connecting a resistance 9 having a prescribed fixed resistance amount with a variable resistance 5' in serial. In this modification, an amount of the resistance does not fall to a zero level. Further, a third modification as illustrated in FIG. 6C includes a parallel type resistance constituted by connecting a resistance 9 having a prescribed fixed resistance amount with a variable resistance 5' in parallel. In this modification, an amount of the resistance may not vary linearly.

These modifications may be optionally selected considering cost, an amount of current, an amount of wattage of the resistance, a withstand voltage, and so on, when an amount of the bias voltage to be impressed on the discharge device 6 is to be determined. An amount of resistance of the resistance 5 illustrated in FIG. 1 can be manually varied when using modifications thereof as illustrated in FIGS. 6A, 6B, and 6C. These modifications each vary both a discharge voltage and a bias voltage.

Obviously, numerous additional modifications and variations of the present invention are possible in light of the above teachings. It is therefore to be understood that within the scope of the appended claims, the present invention may be practiced otherwise than as specifically described herein.

The present document is based on Japanese priority document 09-368923, the entire contents of which are incorporated herein by reference.

I claim:

1. A power supplying apparatus for use in an electrophotographic apparatus, comprising:

- a switching device configured to output an output current when a prescribed pulse of an input current is applied thereto;
- a switching control device configured to control an output operation of said switching device by generating said prescribed pulse, said prescribed pulse having a prescribed width and a prescribed duty cycle, and applying said prescribed pulse to said switching device;
- a transformer with a primary winding connected with said switching device, and which generates a prescribed output voltage at a secondary winding by stepping-up an input voltage induced at said primary winding;
- a rectifying-smoothing device connected with said secondary winding of the transformer configured to rectify and smooth an output current induced by said transformer;
- a parallel resistance connected in parallel with said secondary winding of the transformer by said rectifying-smoothing device;
- an output terminal with a first side connected with a higher potential terminal of said parallel resistance and a second side connected with a process device of said electrophotographic apparatus grounded;
- wherein said switching control device controls said switching operation such that a prescribed amount of constant current flows through said process device in a first mode, and no current flows through said process device and a prescribed voltage is induced at said output terminal in a second mode.

2. A power supplying apparatus as claimed in claim 1, further comprising:

- a feedback circuit with a first side connected with said secondary winding of the transformer and a second side connected with said switching control device;
- wherein said feedback circuit feeds back an output signal representative of an output to be applied to said process device to said switching control device.

3. A power supplying apparatus as claimed in claim 1, wherein said switching control device includes a switching regulator, a reference signal applying device configured to apply a reference signal to said switching regulator, the reference signal representing a prescribed amount of current to flow through said process device during a discharge operation, a ground level applying device configured to apply a ground level voltage to said switching regulator when said discharge operation is stopped, and a switch member configured to selectively connect said switching regulator with one of said reference signal applying device and said ground level applying device; and

- wherein said switching regulator modulates one of a width of a pulse of a direct current flowing therefrom such that a constant current flows through said process device during the discharge operation when said reference signal applying device is connected with said switching regulator in the first mode, and said width of the pulse to a zero level when said ground level applying device is connected to said switching regulator in the second mode.

4. A power supplying apparatus for use in an electrophotographic apparatus, comprising:

- a switching device configured to output an output current when a prescribed pulse of an input current is applied thereto;
- a switching control device configured to control an output operation of said switching device by generating said prescribed pulse, said prescribed pulse having a prescribed width and a prescribed duty cycle, and applying said prescribed pulse to said switching device;
- a transformer with a primary winding connected with said switching device, and which generates a prescribed output voltage at a secondary winding by stepping-up an input voltage induced at said primary winding;
- a rectifying-smoothing device connected with said secondary winding of the transformer configured to rectify and smooth an output current induced by said transformer;
- a parallel resistance connected in parallel with said secondary winding of the transformer by said rectifying-smoothing device;
- an output terminal with a first side connected with a higher potential terminal of said parallel resistance and a second side connected with a process device of said electrophotographic apparatus grounded;
- wherein said switching control device controls said switching operation such that a prescribed amount of constant current flows through said process device in a first mode, and no current flows through said process device and a prescribed voltage is induced at said output terminal in a second mode, wherein said switching control device includes a microcomputer including:

a memory configured to store at least data representative of a zero voltage and data representative of a prescribed reference voltage that causes a prescribed amount of a current to flow through said process device during a discharge operation;

an A/D converter configured to receive a feedback signal and convert the feedback signal into a digital signal;

a pulse width modulation timer configured to modulate a width of a pulse of a direct current flowing therefrom;

wherein said microcomputer sends one of a signal indicating a difference between said digital signal and said prescribed reference voltage to said pulse width modulation timer so that said pulse width modulation timer modulates said pulse such that said feedback signal accords with said prescribed reference voltage and a constant current flows through said process device in the first mode, and data representative of the zero voltage to said pulse width modulation timer to modulate said width of the pulse to a zero level and so that no current flows through said process device and a prescribed voltage is impressed on said process device in the second mode.

5. A power supplying apparatus as claimed in claim 4, wherein said switching control device includes a switching regulator, a reference signal applying device configured to apply a reference signal to said switching regulator, the reference signal representing a prescribed amount of current to flow through said process device during a discharge operation, a pulse width modulation timer configured to output a direct current in a form of a pulse having a prescribed width such that no current flows through said process device and a prescribed voltage is impressed on said process device, and a selection switch configured to selectively connect said switching device with one of said switching regulator and said pulse width modulation timer.

6. A power supplying apparatus as claimed in claim 4, wherein said switching control device includes a microcomputer including:

a memory configured to store at least first data of a first signal that causes a status in which a prescribed amount of current flows through said process device and second data of a second signal that causes a status in which no current flows through said process device and a prescribed voltage is impressed on said process device during a stop of a discharge operation thereof;

an A/D converter configured to receive a feedback signal sent from said secondary winding of the transformer and convert the feedback signal into a digital signal;

a pulse width modulation timer configured to modulate a width of a pulse of a direct current flowing therefrom;

wherein said microcomputer sends one of a signal representative of a difference in voltage between the digital signal and said first data so that said pulse width modulation timer modulates said pulse such that said feedback signal accords with said first data and a prescribed constant current flows through said process device in the first mode, and the second data to said pulse width modulation timer to modulate said width of the pulse such that no current flows through said process device and said prescribed voltage is impressed on said process device in the second mode.

7. A power supplying apparatus as claimed in claim 1, wherein said process device includes a discharge device that includes a corotron and a shield member, which evenly discharge a photoconductive surface of said electrophotographic apparatus.

8. A power supplying apparatus as claimed in claim 3, wherein said process device includes a discharge device that includes a corotron and a shield member, which evenly discharge a photoconductive surface of said electrophotographic apparatus.

9. A power supplying apparatus as claimed in claim 4, wherein said process device includes a discharge device that includes a corotron and a shield member, which evenly discharge a photoconductive surface of said electrophotographic apparatus.

10. A power supplying apparatus as claimed in claim 5, wherein said process device includes a discharge device that includes a corotron and a shield member, which evenly discharge a photoconductive surface of said electrophotographic apparatus.

11. A power supplying apparatus as claimed in claim 6, wherein said process device includes a discharge device that includes a corotron and a shield member, which evenly discharge a photoconductive surface of said electrophotographic apparatus.

12. A power supplying apparatus as claimed in claim 1, wherein said first mode is set when a discharge operation by said discharge device is to be executed, and said second mode is set when said discharge device is not operative.

13. A power supplying apparatus as claimed in claim 3, wherein said first mode is set when a discharge operation by said discharge device is to be executed, and said second mode is set when said discharge device is not operative.

14. A power supplying apparatus as claimed in claim 4, wherein said first mode is set when a discharge operation by said discharge device is to be executed, and said second mode is set when said discharge device is not operative.

15. A power supplying apparatus as claimed in claim 5, wherein said first mode is set when a discharge operation by said discharge device is to be executed, and said second mode is set when said discharge device is not operative.

16. A power supplying apparatus as claimed in claim 6, wherein said first mode is set when a discharge operation by said discharge device is to be executed, and said second mode is set when said discharge device is not operative.

17. A power supplying apparatus for use in an electrophotographic apparatus, comprising:

a switching device configured to output an output current when a prescribed pulse of an input current is applied thereto;

a switching control device configured to control an output operation of said switching device by generating said prescribed pulse, said prescribed pulse having a prescribed width and a prescribed duty cycle, and applying said prescribed pulse to said switching device;

a transformer with a primary winding connected with said switching device, and which generates a prescribed output voltage at a secondary winding by stepping-up an input voltage induced at said primary winding;

a rectifying-smoothing device connected with said secondary winding of the transformer configured to rectify and smooth an output current induced by said transformer;

a parallel resistance connected in parallel with said secondary winding of the transformer by said rectifying-smoothing device;

an output terminal with a first side connected with a higher potential terminal of said parallel resistance and a second side connected with a corona discharger of said electrophotographic apparatus grounded;

wherein said switching control device controls said switching operation such that a predetermined direct current flows through said corona discharge in a first mode to affect a corona discharge operation, and no direct current flows through said corona discharger and a prescribed voltage is induced at said output terminal in a second mode.

18. A power supplying apparatus as claimed in claim 17, further comprising:

a feedback circuit with a first side connected with said secondary winding of the transformer and a second side connected with said switching control device;

wherein said feedback circuit feeds back an output signal representative of an output to be applied to said corona discharger to said switching control device.

19. A power supplying apparatus as claimed in claim 17, wherein said switching control device includes a switching regulator, a reference signal applying device configured to apply a reference signal to said switching regulator, the reference signal representing a prescribed amount of current to flow through said corona discharger during the discharge operation, a ground level applying device configured to apply a ground level voltage to said switching regulator when said discharge operation is stopped, and a switch member configured to selectively connect said switching regulator with one of said reference signal applying device and said ground level applying device; and wherein said switching regulator modulates one of a width of a pulse of a direct current flowing therefrom such that a constant current flows through said corona discharger during the discharge operation when said reference signal applying device is connected with said switching regulator in the first mode, and said width of the pulse to a zero level when said ground level applying device is connected to said switching regulator in the second mode.

20. A power supplying apparatus as claimed in claim 17, wherein said switching control device includes a microcomputer including:

a memory configured to store at least data representative of a zero voltage and data representative of a prescribed reference voltage that causes a prescribed amount of the direct current to flow through said corona discharger during the discharge operation;

an A/D converter configured to receive a feedback signal and convert the feedback signal into a digital signal;

a pulse width modulation timer configured to modulate a width of a pulse of a direct current flowing therefrom;

wherein said microcomputer sends one of a signal indicating a difference between said digital signal and said prescribed reference voltage to said pulse width modulation timer so that said pulse width modulation timer modulates said pulses such that said feedback signal accords with said prescribed reference voltage and the direct current flows through said corona discharger in the first mode, and data representative of the zero voltage to said pulse width modulation timer to modulate said width of the pulse to a zero level and so that no current flows through said corona discharger and a prescribed voltage is impressed on said process device in the second mode.

21. A power supplying apparatus as claimed in claim 20, wherein said switching control device includes a switching regulator, a reference signal applying device configured to apply a reference signal to said switching regulator, the reference signal representing the predetermined direct current to flow through said corona discharger during the discharge operation, a pulse width modulation timer configured to output a direct current in a form of a pulse having a prescribed width such that no current flows through said corona discharger and the prescribed voltage is impressed on the corona discharger, and a selection switch configured to selectively connect said switching device with one of said switching regulator and said pulse width modulation timer.

22. A power supplying apparatus as claimed in claim 20, wherein said switching control device includes a microcomputer including:

a memory configured to store at least first data of a first signal that causes a status in which the predetermined direct current flows through said corona discharger and second data of a second signal that causes a status in which no current flows through said corona discharge and the prescribed voltage is impressed on said process device during a stop of the discharge operation thereof;

an A/D converter configured to receive a feedback signal sent from said secondary winding of the transformer and convert the feedback signal into a digital signal;

a pulse width modulation timer configured to modulate a width of a pulse of a direct current flowing therefrom;

wherein said microcomputer sends one of a signal representative of a difference in voltage between the digital signal and said first data so that said pulse width modulation timer modulates said pulse such that said feedback signal accords with said first data and the predetermined direct current flows through said corona discharge in the first mode, and the second data to said pulse width modulation timer to modulate said width of the pulse such that no current flows through said corona discharger and the prescribed voltage is impressed on said process device in the second mode.

23. A power supplying apparatus as claimed in claim 17, wherein said corona discharger includes a corotron and a shield member, which evenly discharge a photoconductive surface of said electrophotographic apparatus.

24. A power supplying apparatus as claimed in claim 19, wherein said corona discharger includes a corotron and a shield member, which evenly discharge a photoconductive surface of said electrophotographic apparatus.

25. A power supplying apparatus as claimed in claim 19, wherein said corona discharger includes a corotron and a shield member, which evenly discharge a photoconductive surface of said electrophotographic apparatus.

26. A power supplying apparatus as claimed in claim 21, wherein said corona discharger includes a corotron and a shield member, which evenly discharge a photoconductive surface of said electrophotographic apparatus.

27. A power supplying apparatus as claimed in claim 22, wherein said corona discharger includes a corotron and a shield member, which evenly discharge a photoconductive surface of said electrophotographic apparatus.

28. A power supplying apparatus as claimed in claim 17, wherein said first mode is set when the discharge operation by said corona discharger is to be executed, and said second mode is set when said corona discharger is not operative.

29. A power supplying apparatus as claimed in claim 19, wherein said first mode is set when the discharge operation by said corona discharger is to be executed, and said second mode is set when said corona discharger is not operative.

30. A power supplying apparatus as claimed in claim 20, wherein said first mode is set when the discharge operation by said corona discharger is to be executed, and said second mode is set when said corona discharger is not operative.

31. A power supplying apparatus as claimed in claim 21, wherein said first mode is set when the discharge operation by said corona discharger is to be executed, and said second mode is set when said corona discharger is not operative.

32. A power supplying apparatus as claimed in claim 22, wherein said first mode is set when the discharge operation by said corona discharger is to be executed, and said second mode is set when said corona discharger is not operative.

33. A power supplying method for a corona discharger, comprising steps of:

generating a pulse of an input current having a width at a prescribed duty cycle;

applying the pulse to a switching device;

outputting an output current from said switching device;

flowing said output current to a primary winding of a transformer;

stepping-up an input voltage by said transformer;

rectifying-smoothing an output current induced by said transformer;

flowing said output current through both the corona discharger and an output detection resistance;

feeding back a voltage induced by said current flowing through said output detection resistance;

modulating said pulse such that said voltage accords with a prescribed reference voltage in a first mode in which a corona discharge operation is executed; and modulating said pulse such that a current does not flow through the corona discharger and a prescribed bias voltage is impressed on which the discharge open a second mode in which the discharge operation is not executed.

34. A power supplying apparatus for use in an electrophotographic apparatus, comprising:

switching means for outputting an output current when a prescribed pulse of an input current is applied thereto;

switching control means for controlling an output operation of said switching device by generating said prescribed pulse, said prescribed pulse having a prescribed width at a prescribed duty cycle, and applying said prescribed pulse to said switching device;

transforming means, a primary winding of which is connected with said switching device, for inducing a prescribed output voltage at a secondary winding by stepping-up an input voltage;

rectifying-smoothing means connected with said secondary winding of the transformer means for rectifying and smoothing an output current induced by said transformer means;

parallel resistance means connected in parallel with said secondary winding of the transformer means by said rectifying-smoothing means;

output terminal means with a first side connected with a higher potential terminal of said parallel resistance means and a second side connected with a corona discharger of said electrophotographic apparatus grounded;

wherein said switching control means controls said switching operation such that a predetermined direct current flows through the corona discharger in a first mode to affect a corona discharge operation, and no current flows through the corona discharger and a prescribed voltage is induced at said output terminal means in a second mode.

* * * * *